US012276219B2

United States Patent
Monteiro Sales

(10) Patent No.: US 12,276,219 B2
(45) Date of Patent: Apr. 15, 2025

(54) INTEGRATED AUTOMOTIVE REFORMER AND CATALYTIC CONVERTER AND METHOD FOR REFORMING FUEL

(71) Applicant: FCA Fiat Chrysler Automóveis Brasil Ltda., Betim (BR)

(72) Inventor: Luís Carlos Monteiro Sales, Belo Horizonte (BR)

(73) Assignee: FCA Fiat Chrysler Automóveis Brasil Ltda., Betim (BR)

( * ) Notice: Subject to any disclaimer, the term of this patent is extended or adjusted under 35 U.S.C. 154(b) by 0 days.

(21) Appl. No.: 17/926,327

(22) PCT Filed: May 18, 2021

(86) PCT No.: PCT/BR2021/050208
§ 371 (c)(1),
(2) Date: Nov. 18, 2022

(87) PCT Pub. No.: WO2021/232126
PCT Pub. Date: Nov. 25, 2021

(65) Prior Publication Data
US 2024/0287925 A1    Aug. 29, 2024

(30) Foreign Application Priority Data

May 18, 2020 (BR) .................. 10 2020 009905-1
May 10, 2021 (BR) .................. 10 2021 009011-1

(51) Int. Cl.
*F01N 3/20* (2006.01)
(52) U.S. Cl.
CPC ............ *F01N 3/20* (2013.01); *F01N 2240/30* (2013.01); *F01N 2490/00* (2013.01)
(58) Field of Classification Search
CPC .... F01N 2240/02; F01N 2610/03; F01N 5/02; F01N 2370/02; F01N 2240/30
See application file for complete search history.

(56) References Cited

U.S. PATENT DOCUMENTS 4,441,461 A    4/1984  Yoon et al.
10,316,718 B2 *  6/2019  Nagel .................. F01N 3/2066
(Continued)

FOREIGN PATENT DOCUMENTS

BR    112015018123 A2    7/2017
WO    2009102500 A2    8/2009
WO    2012130407 A1    10/2012

OTHER PUBLICATIONS

Ashur et al., "On board Exhaust Gas Reforming of Gasoline using Integrated Reformer & TWC", SAE Technical Paper Series, presented at the 8th International Conference on Engines for Automobile, Capri, Naples, Italy, Sep. 2007, pp. 1-8.
(Continued)

*Primary Examiner* — Anthony Ayala Delgado
(74) *Attorney, Agent, or Firm* — The Webb Law Firm

(57) ABSTRACT

An integrated catalyst reformer is described, including a housing which surrounds and defines at least two individualized and adjacent chambers. The first chamber is intended for the catalytic conversion of exhaust gases from the MCI and at least one second chamber intended for reforming fuel, ethanol or others, and the heat generated in the first chamber is transferred to the second chamber by thermal conduction. The first chamber is connected, upstream, to the exhaust manifold of the MCI from the inlet nozzle and is connected to the exhaust of the vehicle from the outlet nozzle, while the plenum of the first chamber is filled with a catalytic mesh. The second chamber includes a plenum filled with a catalytic mesh; an intake nozzle intended to receive both ambient air and the fuel to be reformed; and an exhaust nozzle, connected upstream of the intake manifold, so as to allow the reformed fuel to be aspirated.

7 Claims, 3 Drawing Sheets

(56) References Cited

U.S. PATENT DOCUMENTS

| | | | |
|---|---|---|---|
| 2009/0120075 A1* | 5/2009 | Kato | F01N 3/0821 60/297 |
| 2013/0167513 A1* | 7/2013 | Cattani | B01D 53/94 422/168 |
| 2014/0216030 A1* | 8/2014 | Cockle | F02D 19/0671 60/278 |
| 2014/0283762 A1* | 9/2014 | Takeyama | F01N 3/36 123/3 |
| 2018/0163593 A1* | 6/2018 | Lee | F01N 3/0235 |

OTHER PUBLICATIONS

Fennell et al., "On-board thermochemical energy recovery technology for low carbon clean gasoline direct injection engine powered vehicles", Proceedings of the Institution of Mechanical Engineers Part D: Journal of Automobile Engineering, 2017, pp. 1-13.

Li et al., "A novel strategy for hydrous-ethanol utilization: Demonstration of a spark-ignition engine fueled with hydrogen-rich fuel from an onboard ethanol/steam reformer", International Journal of Hydrogen Energy, 2013, pp. 5936-5948, vol. 38.

Martin et al., "On-board generation of hydrogen to improve in-cylinder combustion and after-treatment efficiency and emissions performance of a hybrid hydrogen-gasoline engine", International Journal of Hydrogen Energy, 2019, pp. 12880-12889, vol. 44.

Sall et al., "Reforming of Ethanol With Exhaust Heat at Automotive Scale", Energy & Fuels, 2013, pp. 1-51.

Shimada et al., "Improved Thermal Efficiency using Hydrous Ethanol Reforming in Advanced Spark-Ignition Engines", SAE Technical Paper, 2016, pp. 1-8.

Shimada et al., "Innovative Technology for Using Bioethanol to Achieve a Low-carbon Society", Hitachi Review, 2016, pp. 465-469, vol. 65:9.

Tartakovsky et al., "Fuel reforming in internal combustion engines", Progress in Energy and Combustion Science, 2018, pp. 88-114, vol. 67.

* cited by examiner

INTEGRATED AUTOMOTIVE REFORMER AND CATALYTIC CONVERTER AND METHOD FOR REFORMING FUEL

CROSS-REFERENCE TO RELATED APPLICATIONS

This application is the United States national phase of International Application no. PCT/BR2021/050208 filed May 18, 2021, and claims priority to Brazilian Patent Application No. 10 2020 009905-1 filed May 18, 2020, and Brazilian Patent Application No. 10 2021 009011-1 filed May 10, 2021, the disclosures of which are hereby incorporated by reference in their entireties.

BACKGROUND OF THE INVENTION

Field of the Invention

The present invention relates to an automotive reformer and catalyst, or catalytic converter, integrated into a system to energetically increase the fuel from the thermal reform or synthesis of a fraction of this fuel in a device that maximizes the use of heat in the engine exhaust. Internal combustion engine (ICE). The invention also relates to a method for the catalytic reforming of fuel. The conventional fuels of internal combustion engines (ethanol, methanol, gasoline, natural gas or diesel) are part of the scope of this invention.

More specifically, the present invention is intended to promote the energy increase of a fraction of fuel that flows, together with ambient air and/or alternatively with a fraction of the exhaust gas, inside a device with impregnation of catalytic content (for example: Pt, Pd, Rh and etc), and this device under certain temperatures promotes the production of compounds with higher calorific value compared to the original fuel. In this way, the fraction of fuel submitted to this process and in the form of steam, will have a higher energy content that will be mixed with the Air/Fuel mixture that enters the MCI. Therefore, due to the higher energy content, the combustion process of the MCI operating preferably with ethanol (or any other fuel) will be improved, resulting in greater energy efficiency and a reduction in the levels of greenhouse gas emissions and pollutants.

Description of Related Art

It is common knowledge that gasoline has an energy content, or calorific value, approximately 30% greater than that of ethanol. Thus, when an internal combustion engine operates on gasoline, it consumes less fuel, that is, greater autonomy compared to operating on ethanol. This difference is proportional to the energy difference between the two fuels.

To minimize this problem, an alternative known in the art proposes the so-called "reform" of ethanol. The scientific and patent literature illustrates some systems or methodologies related to the thermal reforming of ethanol to obtain mainly hydrogen ($H_2$), which always employ reforming systems or devices that take advantage of the heat dissipated in the exhaust of the ICE. A reference to this technology can be seen in the publication by Atsushi Shimada and Takao Ishikawa, Improved Thermal Efficiency Using Hydrous Ethanol Reforming in SI Engines, SAE Technical Paper 2013-24-0118, published on Aug. 9, 2013. Document WO 2012/130407 teaches a process for the catalytic conversion of alcohol, in the liquid phase, from a compact catalytic device for reforming fuel applicable to an internal combustion engine.

In these known solutions, two separate devices are provided in the MCI exhaust system, the conventional catalytic converter to reduce emission levels and the reformer to mainly promote the obtaining of $H_2$. In this solution, the heating and consequent start-up of the reformer depends on the passage, in its internal part, of the heated exhaust gases so that the reformer reaches the ideal temperatures for obtaining $H_2$ from the ethanol fed into the reformer. That is, the catalytic reactions promoted by the reformer only start after a certain temperature, which is generated by the MCI exhaust gases.

However, this configuration of the ethanol reforming system entails some undesirable effects, such as increasing the complexity of the exhaust system, as a reformer is added to this system, in addition to all the support (pipes and valves) to conduct a fraction of the exhaust gas to the interior of the reformer.

In addition, the exclusive reliance on the exhaust gases to heat the reformer and supply the gases for thermal reforming reactions, allows the mixture of inert gases (eg $CO_2$) to occur with the Air/Fuel mixture, and this mixture of gases can impair combustion if the production of $H_2$ is not sufficient to compensate for the presence of inert gases. In these systems, despite the passage of exhaust gas, the ideal temperatures for the thermal reforming reactions of ethanol are not maintained in a desirable way for continuous production of $H_2$, since variations in engine operating conditions do not guarantee stability of temperatures inside the reformer, thereby limiting system performance.

In SAE publication number 2007-24-0078, which reports the lectures given on the occasion of the 8th International Conference, which took place in Capri/IT between Sep. 16 and 20, 2007, the authors M. Ashur, J. Misztal, M. L. Wyszynski, A. Tsolakis, H. M. Xu, J. Qiao, and S. Golunskl adopted the work entitled "On board Exhaust Gas Reforming of Gasoline using Integrated Reformer & TWC". In this reformer, the inventors propose to involve the catalyst with a monolithic annular fuel reformer, in direct contact with the catalyst (TWC) in order to use part of the heat generated by the catalyst in the fuel reformer. In addition, the catalyst and reformer assembly is surrounded by a cylindrical casing in order to define an external chamber to the TWC catalyst. The exhaust gases, coming from the engine, are separated and proportionally directed to the internal chamber of the TWC catalyst and the external chamber that houses the reformer. Upstream of the reformer, there is also a point for injecting the fuel to be reformed, in this case gasoline. Finally, a first outlet directs the gases released by the TWC catalyst to the exhaust system, while a second outlet releases the reformed fuel in the reformer towards the engine intake. The construction proposal by the inventors achieves the goals of this test, that is, it allows the reform of the fuel from the exhaust gases from a construction with "controlled" dimensions. However, the solution proposed by the inventors is not highly efficient since the reformer operates from the combination of fuel and exhaust gases, so the reformed gases include a large amount of inert gases (see item 2 of this publication), this is exciting the benefits of injecting the reformed gases into the internal combustion engine intake.

SAE publication number 2016-01-2262 dated Nov. 17, 2016, authored by Atsushi Shimada, Yuzo Shirakawa, and Takao Ishikawa, is related to "Improved Thermal Efficiency using Hydrous Ethanol Reforming in Advanced Spark-Ignition Engines". In the proposed study, the authors carry out a series of tests in order to validate the efficiency in reforming specifically hydrated ethanol and the injection of the products of this reform, $H_2$ and $CO_2$, in the engine intake. It is proposed the use of a heat exchanger (see FIG. 7), similar to a radiator, in which ethanol circulates inside reactive lines with a catalyst ($Pt/Al_2O_3$).

Objectives of the Invention

Thus, a first objective of the present invention is a device designed to promote the energy increase of a fuel to enable an increase in energy efficiency and a reduction in pollutant emissions by the internal combustion engine.

A complementary objective of the present invention comprises a reformer and catalyst device integrated in a single equipment.

SUMMARY OF THE INVENTION

These and other objectives are achieved and satisfied from an integrated automotive reformer and catalyst device comprising a housing which surrounds and defines at least two individual and adjacent chambers, the first chamber being destined for the catalytic conversion of the MCI exhaust gases and the at least one second chamber for reforming the fuel, and the heat generated in the first chamber is transferred to the second chamber by thermal conduction.

These and other objectives are achieved and satisfied from a fuel reforming method comprising the step of reforming the fuel via catalyst from the heat generated by the catalytic conversion of exhaust gases from the MCI (1) and also from the heat normally rejected in the exhaustion.

Regarding the constructive aspects of the device of the present invention, the reforming system with production of compounds for the increase of fuel energy foresees the integration of the catalytic converter of the vehicle in the reformer, thus allowing the maximized use of the generated heat. The heat of the catalytic converter is generated by its operation (exothermic chemical reactions due to the catalytic conversion of harmful exhaust gases). In this way, and in the device of the invention, in addition to the heat that is normally rejected by the internal combustion engine through the exhaust, the heat generated by the activity of the catalytic converter is also used. Remembering that for the thermal reform of the fuel adequate temperatures are necessary and that in the condition of integration of the reformer to the catalytic converter the use of heat and consequently the constancy of adequate temperatures occurs in an facilitated way.

In general, this invention aims to contribute to making the use of "Flex Fuel" engines even more viable, making the increase in the use of ethanol even more attractive due to the improvement in performance and autonomy with this fuel. In addition to providing a reduction in the level of carbon dioxide ($CO_2$) emissions and, therefore, fuel consumption, in addition to other polluting gas emissions such as carbon monoxide (CO), hydrocarbons (HC), nitrogen oxides ($NO_x$) and aldehydes. Specifically, in the case of $CO_2$ from the combustion of ethanol, natural renewal occurs through photosynthesis, minimizing the problem of the greenhouse effect. However, other gases that are also part of the gases that promote the greenhouse effect such as methane ($CH_4$) and nitrous oxide ($N_2O$) are also reduced.

BRIEF DESCRIPTION OF THE DRAWINGS

The present invention will be better understood in light of the detailed description of a preferred embodiment, which is supported and illustrated from the attached figures, brought for the mere purpose of illustration and guidance, but not limiting the scope of the invention, in which.

DESCRIPTION OF THE INVENTION

Figure 1:
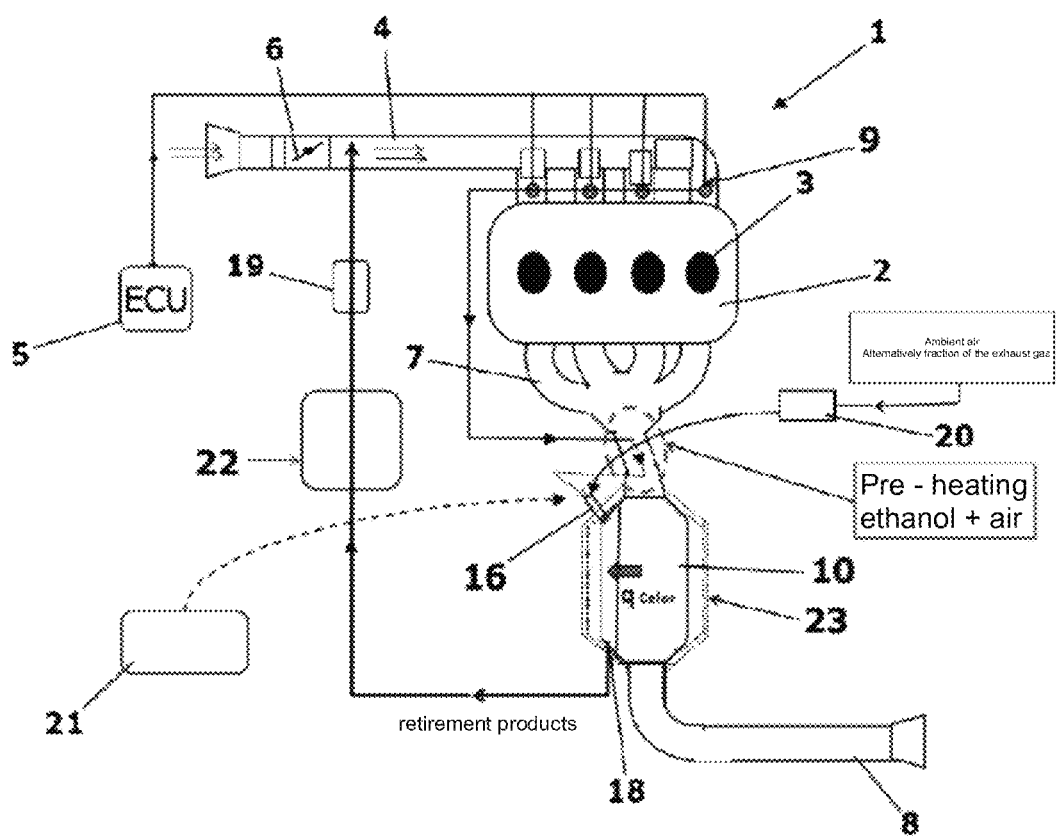
FIG. 1 is a schematic view of an internal combustion engine illustrating the elements directly related to the system of the present invention.

According to the attached figures, with (10) is indicated a reformer catalyst system or device, according to the invention, intended to be coupled to an internal combustion engine (1), or ICE, of a motor vehicle. With particular reference to FIG. 1, the MCI (1) comprises a block (2) which defines, inside, the cylinders (3). Said cylinders (3) are fed by an Air/Fuel mixture in a stoichiometric relation, which can be formed upstream of the intake manifold (4) in indirect injection systems, or inside each cylinder (3), in systems direct injection. For this purpose, an ECU (5), or electronic center, is responsible for providing the admission of a certain amount of fuel, through the injectors (9), according to the driver's requests and the flow of fresh air that is being admitted. In the system—function of the negative pressure in the inlet and position of the throttle (6).

After combustion of the Air/Fuel mixture thus admitted, the exhaust gases are discharged from the exhaust manifold (7), downstream of which a lambda probe (not shown) is provided to determine the residual amount of $O_2$ in the exhaust gases and thus determine the combustion quality, this information is sent to the ECU (5) and used to regulate the Air/Fuel mixture to be admitted.

In conventional systems, the exhaust gases are then conducted through the exhaust (8) of the vehicle, not without passing a catalyst, or catalytic converter, responsible for treating the exhaust gases in order to eliminate the most harmful chemical forms, such as, for example, carbon monoxide which is oxidized to form $CO_2$, hydrocarbons which are also oxidized to form $CO_2$ and $H_2O$. Another reaction conventionally performed on the catalyst is the catalytic reduction of NOx emitted in the forms of $N_2$ and $O_2$. Also as known, despite the need for a minimum initial temperature for such catalytic reactions to occur, these reactions are exothermic.

In this way, the present invention comprises a catalytic system, or catalyst reformer device (10) that integrates a catalyst into a fuel reformer, particularly fuel ethanol, or fuel mixtures containing ethanol, in order to maximize the use of the heat generated by the automotive catalyst, or catalytic converter, by a fuel reformer. Despite the fact that the present description makes specific reference to ethanol as a fuel, it is clear to technicians in the sector that the same concepts and constructions of the catalyst reformer of the invention can also be implemented for other fuels, such as methanol, natural gas or compressed natural gas (CNG), gasoline and diesel.

Figure 2:
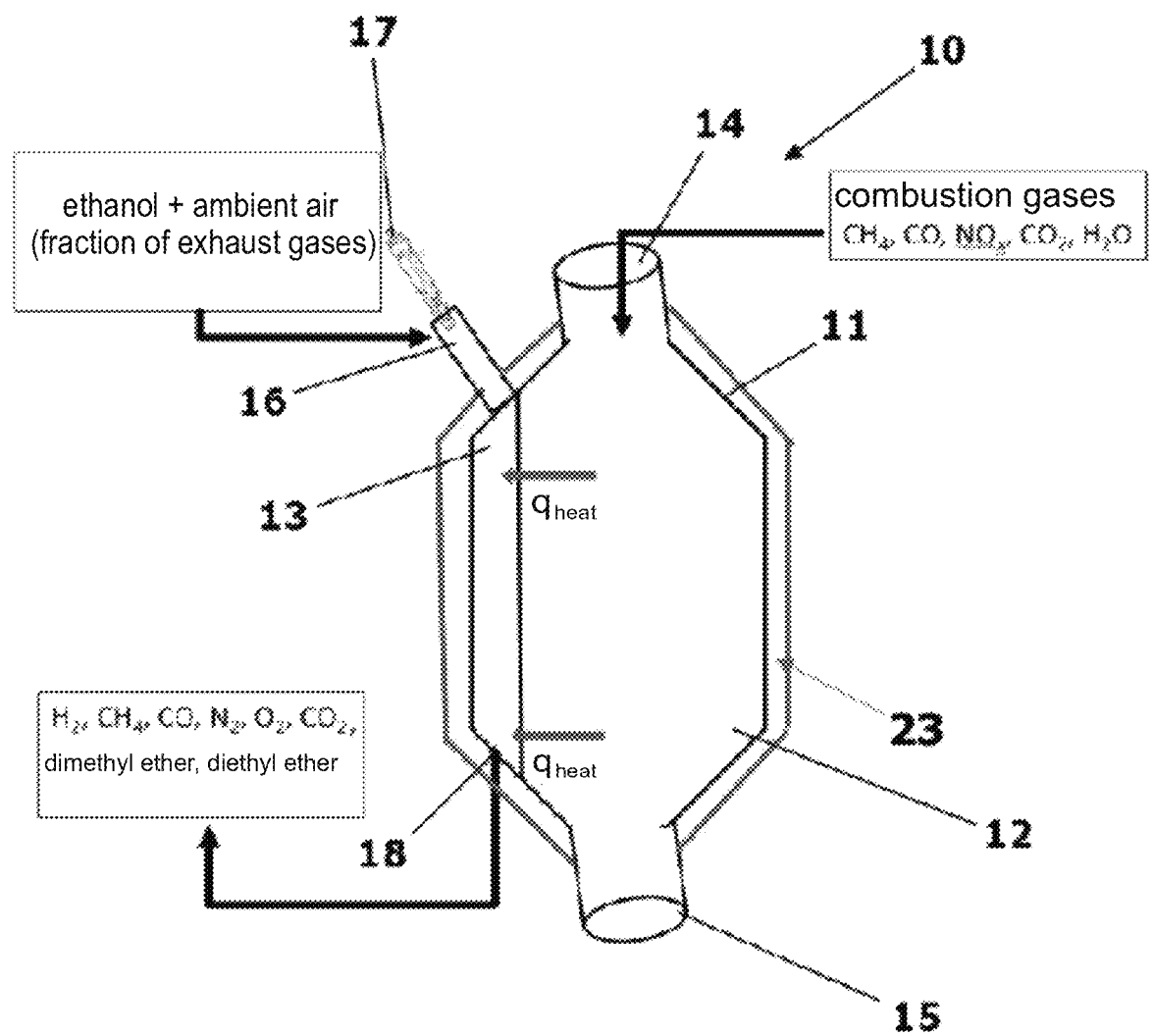
FIG. 2 is a schematic view of an embodiment of the catalyst reformer system according to the invention.

As particularly illustrated in the embodiment of FIG. 2, the device (10) of the invention is externally defined by a housing (11) which surrounds and defines two individual and adjacent chambers, the first chamber (12) being intended for catalytic conversion of the exhaust gases from the MCI and the second chamber (13) destined to reform the fuel alcohol.

More specifically, the first chamber (12) is connected, upstream, to said exhaust manifold (7) of the MCI from the inlet nozzle (14). The plenum of the first chamber (12) is filled with a catalytic mesh so that, when the exhaust gases from the MCI flow through it, the catalysts dispersed in this mesh catalyze the reactions of oxidation or reduction of the components of the exhaust gases to the less harmful ways, indicated above, such processed and minimized gases are then exhausted from the device from the exhaust (8) downstream, which connects to the outlet nozzle (15).

As these reactions are exothermic, the entire internal environment of the first chamber (12) is heated and, therefore, so is the second chamber (13) by heat transfer.

In the plenum of the second chamber (13) the flow of the mixture between ethanol and ambient air, and eventually the exhaust gases, is catalyzed. Such reactions are possible due to the fact that the plenum of the second chamber (13) is properly heated due to the heat transfer that occurs from said first chamber (12) towards the second chamber (13), adjacent to that. As a result of the reactions catalyzed in the second chamber (13), new chemical species (known in the art) are formed depending on the operating temperature of said second chamber (13) and, therefore, the flow of heat emanating from the first chamber (12) to the second chamber (13).

Table 1 below presents information from the art and compiled in order to correlate the compounds of interest, with the catalyst necessary for the production of these compounds of interest and the operational temperatures necessary for the catalytic system to be able to synthesize said compounds of interest.

TABLE 1

| Paper | Element | Catalytic | Temp. |
|---|---|---|---|
| Kinetics and Mechanism of Ethanol Dehydration on $\gamma$-Al$_2$O$_3$: The Critical Role of Dimer Inhibition | Ethylene, diethyl | $\gamma$-Al$_2$O$_3$ ($\gamma$-Alumina) | 488 K = 215° C. |
| Kinetics, Characterization and Mechanism for the Selective Dehydration of Ethanol to Diethyl Ether over Solid Acid Catalysts | Diethyl ether | Aluminophosphate-alumina (APA) catalysts | 200° C.-300° C. |
| Ethanol Dehydration on silica-aluminas: Active sites and ethylene/diethyl ether selectivities | Diethyl ether, ethylene | Silica-Aluminas (Several combinations) | Several Temperatures |
| Heterobimetallic Zeolite, InV-ZSM-5, Enables Efficient Conversion of Biomass Derived Ethanol to Renewable Hydrocarbons | Diethyl ether, ethylene | Zeolite catalysts (V-ZSM-S) | 350° C. |
| Dimethyl ether, diethyl ether & ethylene from alcohols over tungstophosphoric acid based mesoporous catalysts | Dimethyl ether, diethyl ether & ethylene from alcohols | Tungstophosphoric sodium silicate (TPA) | 200° C. |
| Diethyl ether cracking and ethanol dehydration: Acid catalysis and reaction paths | Diethyl ether | Zeolites, alumina and silica alumina | 180° C.-300° C. |
| Dehydration of ethanol over zeolites, silica alumina and alumina: Lewis acidity, Brønsted acidity and confinement effects | Ethanol, diethyl ether | Zeolites, alumina and silica alumina | 180° C.-200° C. |
| Alumina-Platinum Catalyst in the Reductive Dehydration of Ethanol and Diethyl Ether to Alkanes | Ethanol and Diethyl Ether to Alkanes | Alumina - platinum catalyst | 250° C.-400° C. |
| A study of commercial transition aluminas and of their catalytic activity | Ethanol | Alumina | 350° C. |
| Thermodynamic Analysis of Ethanol Processors for Fuel Cell Applications | Hydrogen (H2) | Alumina - platinum catalyst | 550° C.-700° C. |

With regard specifically to said second chamber (13), it comprises a plenum filled with a catalytic mesh similar to the mesh of the first chamber, that is, it may be palladium, platinum, rhodium, silver and/or other appropriate catalysts. The intake nozzle (16) of the second chamber (13) is designed to receive both ambient air (alternatively a fraction of the exhaust gas) and the ethanol to be reformed. Preferably, the ambient air is filtered, via filter (20) before entering the intake nozzle (16). Said feeding nozzle (16) can be connected in order to receive a flow of fresh ambient air, locally combined with a flow of vaporized fuel alcohol through a fuel injector (17) specific for this purpose. In this embodiment, said fuel injector (17) is connected to the fuel pump outlet (not shown), or directly to a specific outlet of the fuel gallery (not shown) on which the fuel injectors (9) are mounted, cylinder feed (3). Alternatively, said inlet nozzle (16) can also receive a partial flow of exhaust gases, which comprises chemical species of interest for the catalytic reactions to be carried out in the catalytic mesh.

As can be easily understood by technicians in the sector, the chemical species obtained from the catalytic reactions promoted in the plenum of the second chamber (13) lead to the synthesis of compounds with greater energy efficiency compared to fuel ethanol. As is well known, the energy yield of a chemical compound is directly linked to the amount of chemical bonds existing in its molecule.

In this way, such synthesized compounds flow from the exhaust nozzle (18) of the second chamber (13), and are then directed to, or upstream of, the intake manifold (4), subsequently distributed in the cylinders (3) of the MCI (1). More specifically, said exhaust nozzle (18) is connected at a point in the supply system, upstream from the intake manifold (4) and downstream from the butterfly valve (6) and, in particular, in a depression region; in this way, the reformed fuel is, in fact, aspirated by the vehicle's fuel system.

Other considerations in relation to the system of the invention include the need to introduce ethanol fuel into the plenum of the second chamber (13) in a pulverized form, and more preferably pulverized and preheated, in order to facilitate evaporation and increase the reform rate. this, mainly in the initial stages after starting the motor (1). To this end, the alcoholic fuel injected by said fuel injector (17) may comprise an electric fuel preheating system (cold start system), similar to that used in the fuel injector(s) (9) of fuel from the cylinders (3), and/or can be heated using the heat of the MCI exhaust gases, transferred by convection between the respective pipes. Similarly, the ambient air, or alternatively the mixture of ambient air and a fraction of the exhaust gas, which is introduced into the reformer can be electrically preheated, and/or can be heated using the heat from the MCI exhaust gases transferred by contact between the respective pipes. It should be noted that preheating is essential to increase the guarantee of fuel evaporation, specifically ethanol, when injected into the reformer chamber, which is also heated. The electric pre-heating system for ethanol and ambient air can remain activated, while the MCI exhaust is still not hot enough to transfer heat to these two fluids at the start of the cold operation of the MCI.

As the temperatures of the compounds from the reform can be high, this energetically increased fraction can pass through a heat exchanger (19) before being introduced into the MCI intake system. Likewise, it is convenient to include an impurity filter (22) before the entry of the compounds from the reform in the MCI intake system.

In an alternative embodiment, the catalytic reforming system of the invention can be timed in relation to the start of the MCI, in order to start the reform of the fuel only after having reached (estimated heating time of the MCI) the minimum operational conditions for the fuel reform.

In an alternative embodiment, the catalytic reforming system of the invention can be conditioned to the identification of a functional parameter of the MCI, such as the coolant temperature and/or ambient air temperature (cold engine identification).

Figure 3:
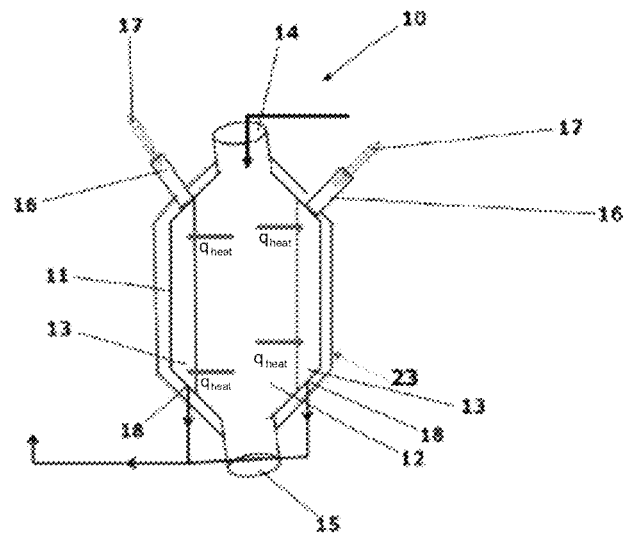
FIG. 3 is a schematic view of a second embodiment of the catalyst reformer system, according to the invention, in which two fuel reformers are provided, one on each side of the catalyst.

In another embodiment alternative, two second chambers (13) are provided, each of the second chambers (13) being laterally disposed in relation to the first chamber (12). Each of the second chambers (13) comprises a plenum filled with a catalytic mesh; an intake nozzle (16) Intended to receive both ambient air and the fuel to be reformed; an exhaust nozzle (18), connected upstream of the intake manifold (4); and a fuel injector (17), arranged upstream of the intake nozzle (16), to inject the fuel to be reformed into the respective second chamber (13). As FIG. 3 illustrates this solution in which two reformers, that is two second chambers (13) are arranged on opposite sides in relation to the catalyst, or first chamber (12). Each of the second chambers (13) of the reformer, in this case, has a respective intake nozzle (16) and respective injector (17). In this solution there is an increase in relation to the heat exchange from the first chamber (12) to the second chamber (13).

Figure 4:
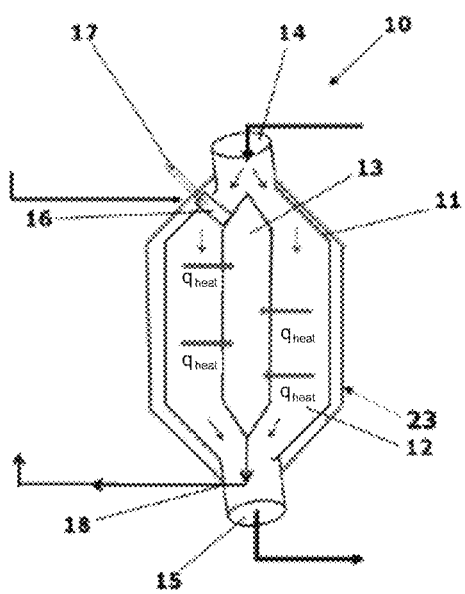
FIG. 4 is a schematic view of a third embodiment of the catalyst reformer system, according to the invention, in which the reformer is positioned in the central part of the automotive catalyst, with the reformer being completely involved radially.

Also alternatively, the first chamber (12) surrounds the second chamber (13); or the second chamber (13) surrounds the first chamber (12). In this construction alternative, illustrated in FIG. 4, the second chamber (13) is cylindrical and completely surrounds the first chamber (12) so that a very significant portion of the heat produced by the first chamber (12) is exclusively directed to the second camera (13). In a variant of this solution (not shown) an inversion is foreseen between the said chambers of FIG. 4, that is, with the second cylindrical chamber (13) being completely surrounded by the first chamber (12), also cylindrical. In this situation it is possible to obtain a more precise control in relation to the percentage of heat emanated from the first chamber and that is directed to the second chamber (13). In addition, the first chamber (12) can surround the second chamber (13), which also results in better use of the heat released by the first chamber (12) by the second chamber (13).

In another embodiment, the catalyst reformer device (10) of the invention is externally coated with a thermal insulating cover (23), also in order to allow a more precise control between the amount of heat generated in the first chamber (12) and transferred to the second chamber (13). Furthermore, said thermally insulating cover (23) may completely or partially surround the first chamber (12) and the second chamber (13).

In another non-illustrated embodiment, the reformer catalyst device (10) of the invention, when foreseen to be installed in a turbo-powered MCI (1), or provided with a supercharger-type super-feed system, the exhaust nozzle (18) is connected at a point in the feed system upstream of the turbocharger or supercharger.

In an alternative embodiment (see FIG. 1), an air filter (20) is provided in order to prevent the ambient air from introducing foreign elements and thus compromising the environment of the plenum of the second chamber (13), as well as the reactions catalysts in this conducted.

In another alternative implementation, a heat exchanger integrated with a filter at the outlet of the reformed products is foreseen, in order to prevent the new fuels from entering the supply system at an excessively high temperature and accompanied by solid impurities.

In a last alternative, and aiming to increase the production of $H_2$ in the reformer, a water reservoir (21) is also provided in order to inject water vapor inside the second chamber (13). In this case, said water reservoir (21) is intended to increase the amount of water originally foreseen in the ethanol fuel, which may not be enough to guarantee a sufficient production of $H_2$ in the reformer. In addition, and in the event that other fuels other than fuel ethyl alcohol are reformed, this extra supply of water will guarantee the necessary raw material for the production of gaseous hydrogen.

Finally, the method of the present invention comprises the step of reforming the fuel via catalyst from the heat generated by the catalytic conversion of exhaust gases from the MCI and also from the heat normally rejected in this same exhaust system (1).

The invention claimed is:

1. An integrated catalyst reformer, comprising a housing which surrounds and defines two individual and adjacent chambers, the first chamber being intended for the catalytic conversion of exhaust gases from the MCI and the second chamber destined to reform the fuel, and the heat generated in the first chamber is transferred to the second chamber by thermal conduction, the second chamber comprises a plenum filled with a catalytic mesh; an intake nozzle intended to receive both ambient air and the fuel to be reformed; and an exhaust nozzle, connected upstream of the intake manifold, so as to allow the reformed fuel to be aspirated, a fuel injector, arranged upstream of the intake nozzle, to inject the fuel to be reformed into the second chamber, and a thermally insulating cover surrounding, totally or partially, the first chamber and the second chamber.

2. The catalyst reformer, according to claim 1, wherein the first chamber is connected, upstream, to the MCI exhaust collector from the inlet nozzle; be connected to the exhaust of the vehicle from the outlet nozzle; and the plenum of the first chamber is filled with a catalytic mesh.

3. The catalyst reformer, according to claim 1, wherein the first chamber surrounds the second chamber.

4. The catalyst reformer, according to claim 1, wherein the second chamber surrounds the first chamber.

5. The catalyst reformer, according to claim 1, comprising two second chambers, each of the second chambers being laterally disposed with respect to the first chamber.

6. The catalytic reformer, according to claim 5, wherein each of the second chambers comprises a plenum filled with a catalytic mesh; an intake nozzle intended to receive both ambient air and the fuel to be reformed; an exhaust nozzle, connected upstream of the intake manifold; and a fuel injector, arranged upstream of the intake nozzle, to inject the fuel to be reformed into the respective second chamber.

7. A fuel reforming method, of the type to be carried out by an integrated catalyst reformer as defined in claim 1, wherein the step of reforming via catalyst the fuel from the heat generated by the catalytic conversion of the exhaust gases of the MCI and also the heat normally rejected in the exhaust.

\* \* \* \* \*

UNITED STATES PATENT AND TRADEMARK OFFICE
CERTIFICATE OF CORRECTION

PATENT NO. : 12,276,219 B2
APPLICATION NO. : 17/926327
DATED : April 15, 2025
INVENTOR(S) : Luís Carlos Monteiro Sales Page 1 of 1

It is certified that error appears in the above-identified patent and that said Letters Patent is hereby corrected as shown below:

In the Claims

Column 9, Line 6, Claim 6, delete "The catalytic reformer," and insert -- The catalyst reformer, --

Signed and Sealed this
Eighth Day of July, 2025

Coke Morgan Stewart
*Acting Director of the United States Patent and Trademark Office*